United States Patent
Fontaine et al.

(10) Patent No.: US 12,099,432 B2
(45) Date of Patent: Sep. 24, 2024

(54) WORKFLOWS

(71) Applicant: Stripe, Inc., South San Francisco, CA (US)

(72) Inventors: Timothy James Fontaine, San Francisco, CA (US); Kenneth Auchenberg, New York, NY (US); Gabriel Hurley, Oakland, CA (US); Justin Tulloss, Truckee, CA (US)

(73) Assignee: Stripe, Inc., South San Francisco, CA (US)

( * ) Notice: Subject to any disclaimer, the term of this patent is extended or adjusted under 35 U.S.C. 154(b) by 88 days.

(21) Appl. No.: 18/094,281

(22) Filed: Jan. 6, 2023

(65) Prior Publication Data
US 2024/0232046 A1     Jul. 11, 2024

(51) Int. Cl.
| | | |
|---|---|---|
| *G06F 11/36* | (2006.01) | |
| *G06F 8/10* | (2018.01) | |
| *G06F 8/38* | (2018.01) | |
| *G06F 9/445* | (2018.01) | |
| *G06F 9/455* | (2018.01) | |
| *G06F 11/07* | (2006.01) | |
| *G06F 11/34* | (2006.01) | |

(52) U.S. Cl.
CPC .......... *G06F 11/3604* (2013.01); *G06F 8/10* (2013.01); *G06F 8/38* (2013.01)

(58) Field of Classification Search
CPC .......... G06F 11/3604; G06F 8/10; G06F 8/38; G06F 11/3006; G06F 16/2228; G06F 11/302; G06F 11/0751; G06F 11/079; G06F 11/0769; G06F 11/362; G06F 11/0775; G06F 11/3476
See application file for complete search history.

(56) References Cited

U.S. PATENT DOCUMENTS

| | | | |
|---|---|---|---|
| 9,442,832 B2 * | 9/2016 | Bharara | ............. G06F 11/0748 |
| 11,107,580 B1 | 8/2021 | Felton | |
| 11,245,744 B1 | 2/2022 | Brevoort et al. | |
| 11,289,200 B1 | 3/2022 | Gregg | |
| 11,444,903 B1 | 9/2022 | Brevoort et al. | |
| 11,455,166 B2 | 9/2022 | Brevoort et al. | |
| 11,558,453 B2 | 1/2023 | Brevoort et al. | |
| 2005/0021405 A1 | 1/2005 | Agarwal | |
| 2009/0182565 A1 | 7/2009 | Erickson | |
| 2019/0332808 A1 | 10/2019 | Dunjic | |
| 2020/0204574 A1 | 6/2020 | Christian | |
| 2021/0149688 A1 | 5/2021 | Newell et al. | |
| 2022/0060523 A1 | 2/2022 | Brevoort et al. | |
| 2022/0245557 A1 | 8/2022 | Minter | |
| 2022/0414526 A1 | 12/2022 | Darrah | |

* cited by examiner

*Primary Examiner* — Thuy Dao
(74) *Attorney, Agent, or Firm* — BAKERHOSTETLER

(57) ABSTRACT

In some embodiments, after receiving event data corresponding to an event-based workflow, the computer system attempts to cause execution of the first step corresponding to one or more events; and in response to receiving an indication that execution of the first step corresponding to the one or more events has failed, the computer system resolves failure the first step in a manner that is based one or more execution criteria (e.g., failure criteria) that is associated with the first step.

20 Claims, 6 Drawing Sheets

WORKFLOWS

TECHNICAL FIELD

The disclosure generally relates to the development of workflows in software development.

BACKGROUND

Software developers often enable an application to perform a task that another software developer has previously enabled another application to perform. To enable the application to perform the task, software developers often write computer code and/or map out logical steps using workflows or some other component(s) using a low-code and/or no-code platform. Thus, it is often optimal for a software developer to be able to reuse previously developed computer code and/or mapped out logical tasks when developing software applications to preserve time and/or financial resources.

SUMMARY

When creating workflows, software developers often need to incorporate one or more existing workflows (from the same or different sources), modify a portion of an existing workflow, and/or incorporate one or more sub-parts of an existing workflow (e.g., a step). Creating a workflow by leveraging one or more existing components (e.g., steps, workflows) can reduce development time and complexity, but can result in errors occurring when the workflows are executed due to integration issues (e.g., if multiple components are interfacing to perform a task, it can be difficult to determine where an error is occurring). Because reduced development time and complexity can be desirable to software developers, techniques are needed for handling errors that occur during execution of a workflow.

This disclosure provides techniques for reusing previously developed workflows to perform one or more tasks (e.g., that another application has already been enabled to perform). For example, a first software developer can develop a workflow for completing a task. In some embodiments, to develop the workflow, the first developer writes computer code and/or maps out logical steps to enable an application to complete the task. In some embodiments, one or more of the logical steps are constructed so that they occur based on whether one or more events have occurred (e.g., a user of an application clicking a button and/or scrolling a webpage). After the first software developer creates the workflow, a second software developer that is developing a different application can copy the workflow for completing the task that was developed by the first developer. In some embodiments, the first software developer or the second software developer can define one or more failure policies for one or more steps of the workflow, such that when a particular step of the workflow fails, a computer system resolves the failure in a manner based on the failure policy for the particular step. In some embodiments, resolving the failure includes reattempting (or retrying) to perform the failed step and/or disabling the failed step. In some embodiments, the failed step will be disabled such that other developers (e.g., other than the first developer and the second developer) are notified that the failed step (or workflow) has been disabled.

In some embodiments, a method that is performed by a computer system is described. In some embodiments, the method comprises: identifying, electronic data corresponding to an event-based workflow, the electronic data including data corresponding to a first step corresponding to one or more events and data corresponding to a second step corresponding to the one or more events, wherein the first step is different from the second step; after receiving event data corresponding to the event-based workflow, attempting to cause execution of the first step corresponding to the one or more events; and in response to receiving an indication that execution of the first step corresponding to the one or more events has failed: in response to determining that the first step is associated with a first set of one or more execution criteria, resolving failure of the first step in a first manner that corresponds to the first set of one or more execution criteria; and in response to determining that the first step is associated with a second set of one or more execution criteria that is different from the first set of one or more execution criteria, resolving failure of the first step in a second manner that corresponds to the second set of one or more execution criteria, wherein the second manner is different from the first manner.

In some embodiments, a non-transitory computer-readable storage medium storing one or more programs configured to be executed by one or more processors of a computer system is described. In some embodiments, the one or more programs includes instructions for: identifying, electronic data corresponding to an event-based workflow, the electronic data including data corresponding to a first step corresponding to one or more events and data corresponding to a second step corresponding to the one or more events, wherein the first step is different from the second step; after receiving event data corresponding to the event-based workflow, attempting to cause execution of the first step corresponding to the one or more events; and in response to receiving an indication that execution of the first step corresponding to the one or more events has failed: in response to determining that the first step is associated with a first set of one or more execution criteria, resolving failure of the first step in a first manner that corresponds to the first set of one or more execution criteria; and in response to determining that the first step is associated with a second set of one or more execution criteria that is different from the first set of one or more execution criteria, resolving failure of the first step in a second manner that corresponds to the second set of one or more execution criteria, wherein the second manner is different from the first manner.

In some embodiments, a transitory computer-readable storage medium storing one or more programs configured to be executed by one or more processors of a computer system is described. In some embodiments, the one or more programs includes instructions for: identifying, electronic data corresponding to an event-based workflow, the electronic data including data corresponding to a first step corresponding to one or more events and data corresponding to a second step corresponding to the one or more events, wherein the first step is different from the second step; after receiving event data corresponding to the event-based workflow, attempting to cause execution of the first step corresponding to the one or more events; and in response to receiving an indication that execution of the first step corresponding to the one or more events has failed: in response to determining that the first step is associated with a first set of one or more execution criteria, resolving failure of the first step in a first manner that corresponds to the first set of one or more execution criteria; and in response to determining that the first step is associated with a second set of one or more execution criteria that is different from the first set of one or more execution criteria, resolving failure of the first step in a second manner that corresponds to the second set of one or more execution criteria, wherein the second manner is different from the first manner.

In some embodiments, a computer system is described. In some embodiments, the computer system comprises one or more processors and memory storing one or more program configured to be executed by the one or more processors. In some embodiments, the one or more programs includes instructions for: identifying, electronic data corresponding to an event-based workflow, the electronic data including data corresponding to a first step corresponding to one or more events and data corresponding to a second step corresponding to the one or more events, wherein the first step is different from the second step; after receiving event data corresponding to the event-based workflow, attempting to cause execution of the first step corresponding to the one or more events; and in response to receiving an indication that execution of the first step corresponding to the one or more events has failed: in response to determining that the first step is associated with a first set of one or more execution criteria, resolving failure of the first step in a first manner that corresponds to the first set of one or more execution criteria; and in response to determining that the first step is associated with a second set of one or more execution criteria that is different from the first set of one or more execution criteria, resolving failure of the first step in a second manner that corresponds to the second set of one or more execution criteria, wherein the second manner is different from the first manner.

In some embodiments, a computer system is described. In some embodiments, the computer system includes: means for identifying, electronic data corresponding to an event-based workflow, the electronic data including data corresponding to a first step corresponding to one or more events and data corresponding to a second step corresponding to the one or more events, wherein the first step is different from the second step; means, after receiving event data corresponding to the event-based workflow, for attempting to cause execution of the first step corresponding to the one or more events; and means, responsive to receiving an indication that execution of the first step corresponding to the one or more events has failed, for: in response to determining that the first step is associated with a first set of one or more execution criteria, resolving failure of the first step in a first manner that corresponds to the first set of one or more execution criteria; and in response to determining that the first step is associated with a second set of one or more execution criteria that is different from the first set of one or more execution criteria, resolving failure of the first step in a second manner that corresponds to the second set of one or more execution criteria, wherein the second manner is different from the first manner.

In some embodiments, a computer program product is described. In some embodiments, the computer program product comprises one or more programs configured to be executed by one or more processors of a computer system. In some embodiments, the one or more programs includes instructions for: identifying, electronic data corresponding to an event-based workflow, the electronic data including data corresponding to a first step corresponding to one or more events and data corresponding to a second step corresponding to the one or more events, wherein the first step is different from the second step; after receiving event data corresponding to the event-based workflow, attempting to cause execution of the first step corresponding to the one or more events; and in response to receiving an indication that execution of the first step corresponding to the one or more events has failed: in response to determining that the first step is associated with a first set of one or more execution criteria, resolving failure of the first step in a first manner that corresponds to the first set of one or more execution criteria; and in response to determining that the first step is associated with a second set of one or more execution criteria that is different from the first set of one or more execution criteria, resolving failure of the first step in a second manner that corresponds to the second set of one or more execution criteria, wherein the second manner is different from the first manner.

Executable instructions for performing these functions are, optionally, included in a non-transitory computer readable storage medium or other computer program product configured for execution by one or more processors. Moreover, details of one or more examples, implementations, and/or embodiments are set forth in the accompanying drawings and the description below. Other components, features, aspects, and potential advantages will be apparent from the description and drawings, and from the claims.

BRIEF DESCRIPTION OF THE FIGURES

For a better understanding of the various described embodiments, reference should be made to the Detailed Description below in conjunction with the following figures in which like reference numerals refer to corresponding parts throughout the figures.

DETAILED DESCRIPTION

Figure 1:
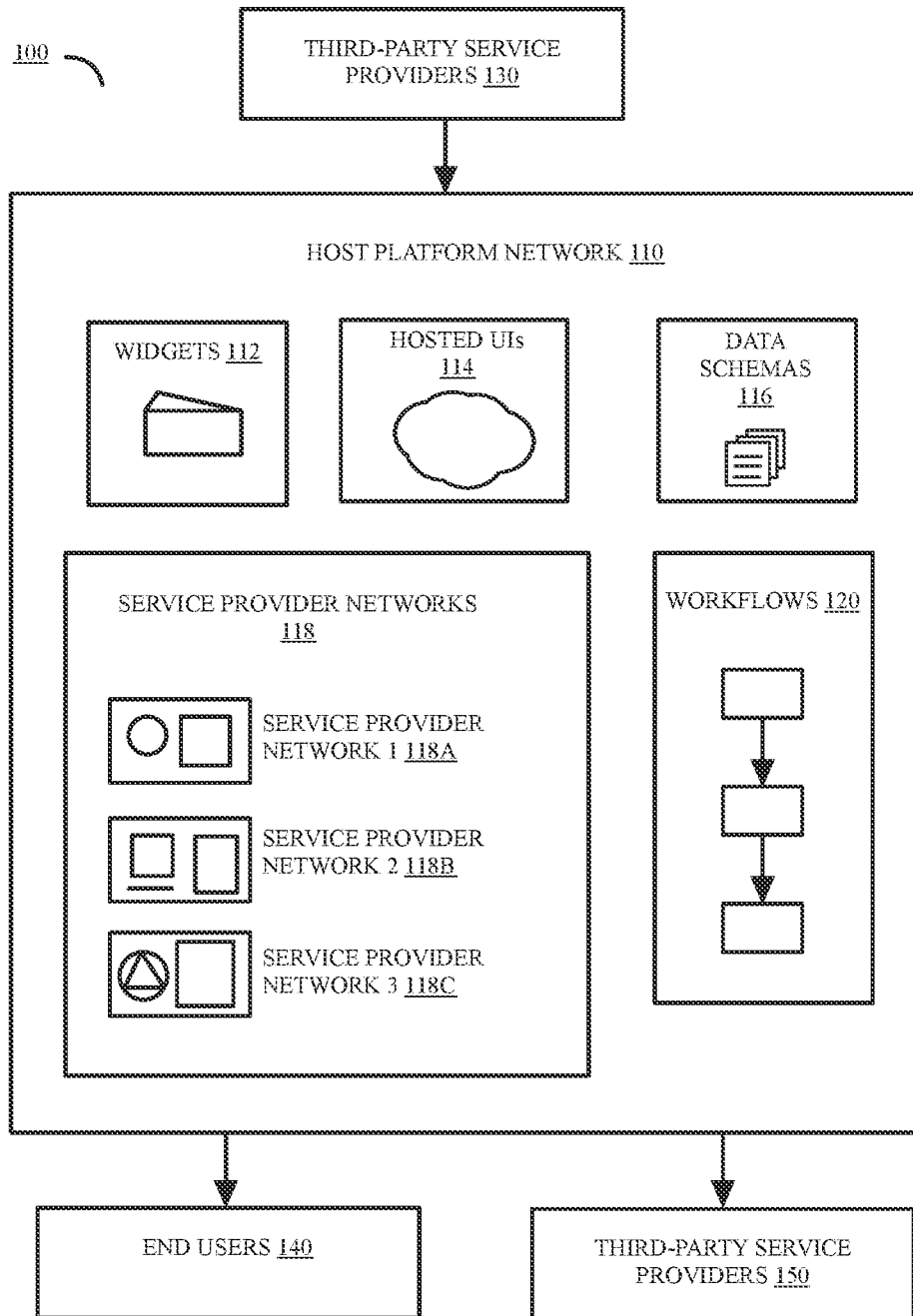
FIG. 1 is a block diagram illustrating the logical relationship between different entities and components associated with a network ecosystem, in accordance with one or more embodiments.

The detailed description described below describes various examples with reference to the accompanying drawings. Some, but not all, examples are shown and described herein. Indeed, the examples can take many different forms and/or be augmented in many different ways. Accordingly, this disclosure should not be construed as limited to the examples set forth herein. Rather, these examples are provided so that this disclosure will satisfy applicable legal requirements.

Businesses today rely on software tools (e.g., applications, components, plug-ins, and/or the like) to run aspects of their operations. Such software tools are typically sourced by a group of software developers and maintained by a business or the group of software developers. However, a single software tool from a single group of software developers is rarely sufficient to perform all the functions needed by the business or its end users. It may be possible to combine third-party extensions, plug-ins, components, or ancillary software, but doing so can be labor intensive, complicated, and/or inefficient. Therefore, interoperability and/or integration are concerns for businesses because they provide user experiences for accessing shared data, automating processes, and additional functionalities that may not be provided by a single application. Poor interoperability and/or integration can lead to errors, a need for manual intervention, inefficiencies, delay, increased financial expenditure, and poor experience for the business's users (e.g., for a business user or customer if a portion of the software tool is part of a digital storefront).

Interoperability and integration are not the only factors that software tool users must consider. The security and/or privacy of business users' data (including customer data) is often another concern. Exposure of a business' data can result in financial consequences due to fraud or result in damage to customer relationships. Such data can include business information, information concerning one or more users of the business, payment information, account information, usage information, etc.). With software-as-a-service and cloud-based computing gaining widespread acceptance, much of a user's data can be transmitted between many locations and/or entities and stored remotely. As the number of software tools increases, particularly where each is managed by a different third-party provider, the number of entities that must be trusted to handle a business' data increases and the additional increase in the number of data exchanges leads to added security and/or privacy risks.

Therefore, demand exists for an ecosystem that allows businesses, applications, and functional services to integrate seamlessly with each other and/or to maintain better user experience across many different deployments. This can ensure the minimal and secure exchanging of (and/or access to) underlying sensitive data, such as business data and/or personal data associated with the business' customers.

The ecosystem can be built around functionality provided by a host platform that is associated with a trusted entity. In some embodiments, one or more resources of the host platform handles storage of data for processing by third-party applications, provides security and permissions-based access control to such data, and/or provides and maintains software development tools that enable third-party developers to develop applications that are compatible with the ecosystem. These software development tools can include software development kits (SDKs), application programming interfaces (APIs), data schemas, custom objects, software components, libraries, functions, routines, etc. that enable creation of modular applications that can work together. For example, a set of data sourced from one third-party entity can be used by application components of different entities (e.g., different third parties or the host platform). This is possible because of, for example, the host platform providing one or more data schemas that define how metadata is defined so that application components from different platforms can properly handle and/or process the set of data.

For such an ecosystem to be accessible to third-party developers (e.g., third-party service providers), mechanisms can exist that enable third parties to develop software tools that are compatible with the ecosystem and maintain the assurances regarding integration, user experience, and/or data integrity. A third-party developer may want to integrate their current application with other components, workflow steps, applications, and/or services from other third-parties or the host platform. Rather than having to look in lots of places or integrate all these pieces themselves via APIs, etc., the ecosystem can allow the third-party developer to go to a host platform network that exposes available integration options. The host platform network can allow third parties to set up their own networks (also referred to as "network-as-a-service") where another third-party developer (or other user) can find relevant components that can be integrated with a target application. A third-party network can be a third-party customized and/or curated version of the host platform network. Components within the third-party network can include branding and identify information for the third-party even though it is hosted by the host platform network.

Regardless of whether a network is managed by the host platform or by a third party, an end user sourcing components can know that the ecosystem is taking care of integration and/or data handling. This integration and/or data handling can be achieved due to the APIs, data schemas, and custom objects made available by the host platform. The host platform can also define, confirm, and/or enforce permissions for accessing data (e.g., stored by the host platform) by ecosystem components. For example, an application component for messaging customers can be permitted to access customer contact information but not a business' accounting data, even though both are stored by the host platform and associated with a user of the application component.

An example architecture is described herein for creating and deploying an ecosystem that meets some or all the criteria set forth above. Technical features of the architecture are addressed briefly below. It should be understood that the details discussed below are merely exemplary of architecture for creating and/or deploying an ecosystem that meets some or all the criteria set forth above, and other architectures could be used in addition to and/or in lieu of the architecture discussed below to create and deploy an ecosystem that meets some or all the criteria set forth above.

Various embodiments described herein make reference to one or more of the components of FIG. 1, which is explained in more detail below. FIG. 1 illustrates an example block diagram 100. The components illustrated therein can perform, alone or in any combination, one or more processes for implementing one or more aspects of an application exchange ecosystem that can enable one or more of the features described herein.

FIG. 1 is block diagram 100 that illustrates the logical relationship between different entities and components associated with an ecosystem for integrating such components with a host platform network, in accordance with one or more embodiments. FIG. 1 includes host platform network 110, representing infrastructure (e.g., hardware and/or software) associated with a host platform that supports the ecosystem. As shown, the host platform network 110 includes one or more widgets 112, one or more hosted user interfaces (UIs) 114, one or more data schemas 116, and one or more workflows 120. In some embodiments, a widget is one or more of an application or an application component. In some embodiments, a hosted user interface (UI) is one or more UI elements provided by and/or managed by the host platform. For example, a hosted UI element can be a pre-made UI element that end users 140 and/or third-party service providers 150 can integrate into their own application. As shown, end users 140 and third-party service providers 150 receive content from host platform network 110. An end user of end users 140 can be a party that uses (e.g., causes download, execution, and/or integration of) a component accessed via network 110 or 118A-118C. A third-party service provider of third-party service provider 150 can be a party that uses (e.g., causes download, execution, and/or integration of) a component accessed through network 110 or 118A-118C into their own application (and can also be considered an end user in some scenarios). In some embodiments, a data schema describes the logical organization of one or more databases. In some embodiments, data schemas support the exchange of data between different applications or components running on the host platform and provides a uniform interface for controlling permissions based on schema (e.g., a shape of the data to be shared). In some embodiments, a workflow describes a set of steps for accomplishing a particular task. For example, these steps can be downloaded (e.g., as widgets, hosted UIs, data schemas) and implemented together on a third-party webpage or host platform. In some embodiments, data schemas also specify the permissions in which a third-party component or application can access data associated with a host or other third-party component or application. In some embodiments, data schemas are used to determine data access by various applications on a per-user basis. Depending on the role of the user or organization, a data schema may specify that a second application cannot access data from a first application that has specific access permissions specified.

FIG. 1 additionally depicts service provider networks 118. These service provider networks 118 are networks that are managed by (e.g., created, curated by) one or more third-party service providers. This is the network-as-a-service concept discussed above. For example, a third-party service provider can be a software developer of tax preparation software tools. This software developer creates a tax preparation-related component that is compatible with the ecosystem (e.g., using software development tools provided by the host platform). This ecosystem-compatible component can be offered to end users 140 via the software developer's service provider network (e.g., 118A). An end user (e.g., 140) can also navigate to other service provider networks (e.g., 118B or 118C) to download other components that can be integrated with the tax preparation-related component. For example, the end user can download a business transaction tracking application from network 118B and a real estate expense tracking application component from network 118C. In this example, the business transaction tracking application integrates the tax preparation-related and business transaction tracking components so that data can be shared between them, and their functionality combined.

In some examples, the network-as-a-service offered by the host platform can handle one or more of the following functions: user account management, billing and licensing, and installer activation. User account management can include handling user account information (e.g., logins, account history, etc.). Billing and licensing can include billing users for software licenses, accepting payments, managing licenses and subscriptions, etc. Installer activation can include enabling licensed components accessed through the host platform network, configuring the components to work with the end user's system, connecting the components with other services or applications that the end user wants to integrate with, etc.

FIG. 1 additionally depicts third-party service providers 130 providing content into host platform network 110. Third-party service providers 130 can include the same or different third parties than third-party service providers 150. Third-party service providers 130 include third parties that make contributions to the host platform network 110. These contributions can be one or more widgets 112, one or more hosted UIs 114, one or more data schemas 116, one or more service providers networks 118A-118C, and/or one or more workflows 120. For example, a third-party service provider of third-party service providers 130 can be an entity that developed a single component that is made available to end users 140 and/or to third-party service providers 150 via host platform network 110. A third-party service provider can be a party that includes a component (from another third party) into their own service provider network and offers it to end users for integration with the service provider's application. For example, the third-party that manages network 118B (offering the business transaction tracking application) can also offer the tax preparation-related application component in network 118B. End users looking for a tax software tool compatible with the business transaction tracking application would see the tax preparation-related application component available for retrieval in network 118B.

FIG. 1 depicts service provider networks 118A-118C within host platform network 110. However, this depiction is not intended to be limiting in terms of how any components are stored, managed, etc., but are merely illustrated as logical relationships. In some embodiments, a service provider network is accessible via a host platform network. For example, an end user (e.g., 140) can access service provider network 118A by navigating within host platform network 110. In some embodiments, a service provider network is based on host platform network 110. For example, the service provider network is hosted by a third-party service provider but is built based on components of host platform network 110. In some embodiments, third-party service provider components and applications are hosted by the host platform network and have been verified and approved for submission to the host platform network.

Figure 2:
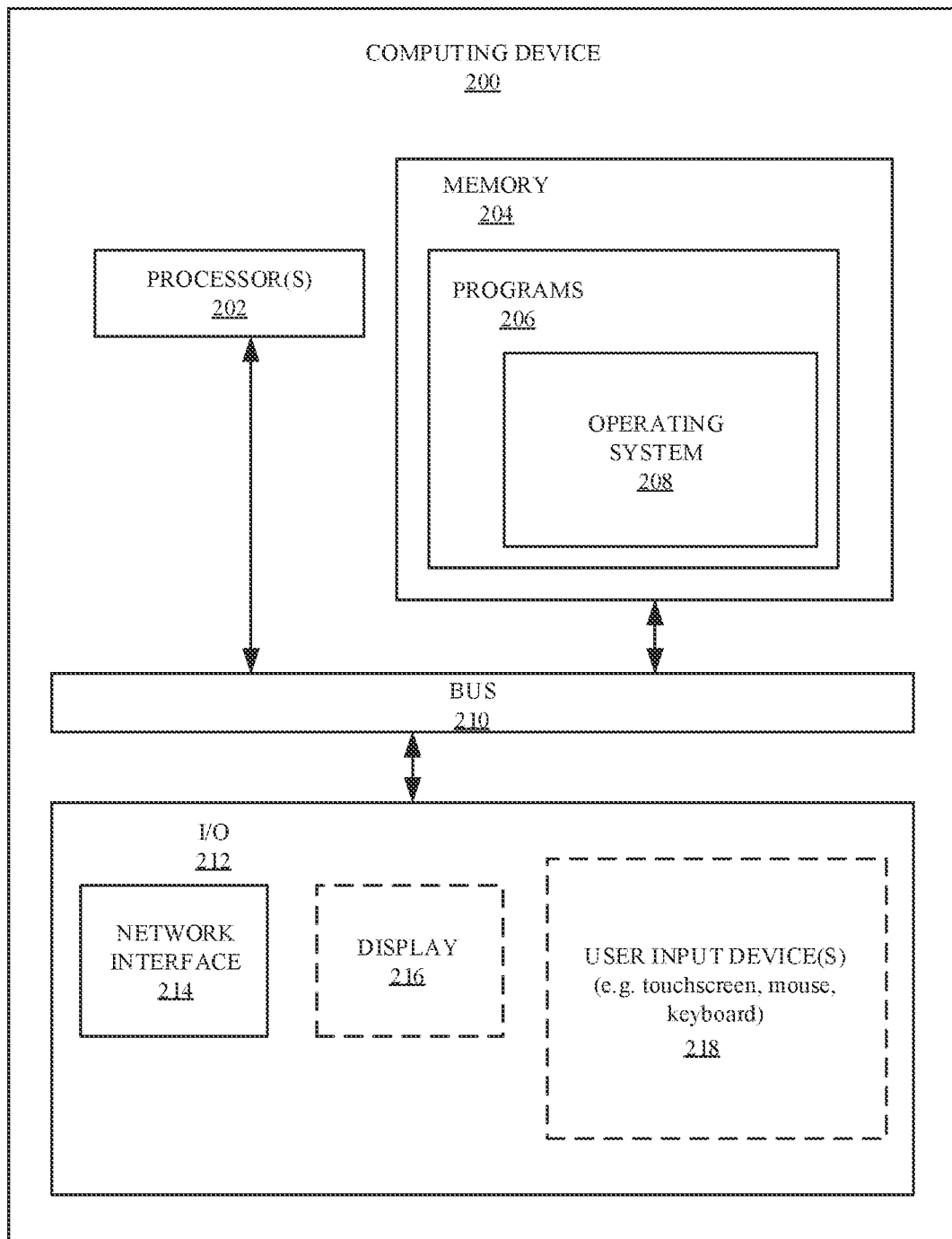
FIG. 2 is a block diagram of a computing device that implements one or more processes in accordance with one or more embodiments described herein.

FIG. 2 illustrates an example computing device 200 (alternatively referred to as computing system 200, computer system 200, system 200, electronic device 200, and/or device 200) that can be used to support and/or implement the architecture and operations in accordance with one or more embodiments described herein. It will be apparent to those of ordinary skill in the art, however, that other alternative systems of various system architectures can also be used. For example, the other alternative systems can be a computing system with fewer, different, and/or additional components than those illustrated in (and/or described in relation to) FIG. 2 or a computing system including one or more devices 200 as illustrated in FIG. 2. In some embodiments, computing device 200 is a general-purpose computer. In some embodiments, computing device 200 is a special purpose (e.g., application specific) hardware device.

Computing device 200 illustrated in FIG. 2 includes one or more bus (or other internal communication component) 210 for communicating information and one or more processors 202 coupled to the bus 210 for processing information. Device 200 includes memory 204 coupled to bus 210. Memory 204 can include random access memory (RAM) or other volatile storage device 204 for storing information and instructions to be executed by one or more processors 202 and/or for storing temporary variables or other intermediate information during execution of instructions by one or more processors 202. Memory 204 can also include non-volatile memory storage, such as read-only memory (ROM) and/or a static storage device for storing static information and instructions executable by processors 202, and one or more data storage devices such as a hard disk (e.g., magnetic disk), flash memory storage, or optical disk and its corresponding disk drive. This data storage device can be coupled to bus 210 for storing information and instructions. For example, memory 204 can store programs 206 in non-volatile memory. In some embodiments, the programs include one or more sets of computer-executable instructions for execution by the one or more processors 202. When ready for execution, the instructions are loaded into volatile memory and passed the processors for execution. The programs 206 can include an operating system 208 for managing the computing device's basic functionality, such as scheduling tasks, executing applications, and controlling peripheral devices. As used herein, the term "program" or "computer program" are considered synonymous with "application," "computer application, or "application component" unless otherwise stated in the context in which the term is used.

Computing device 200 can also include one or more input/output (I/O) components 212. FIG. 2 illustrates several example I/O components grouped together within I/O components 212 for illustration purposes only, and each such component therein does not necessarily need to be located together, or within a part of computing device 200. For example, an I/O component 212 can be an external device coupled to an interface of computing device 200. Computing device 200 can include network interface 214 for handling uplink and/or downlink communications with one or more other devices. The network interface 214 can itself be a communication device and can include any of a number of commercially available networking peripheral devices such as those used for coupling to an Ethernet connection, Wi-Fi connection, 3GPP mobile communication protocol (e.g., 3G, 4G, LTE, 5G, NR, and/or the like), and/or the like, to communicate over the Internet, a wide area network, a local area network, an ad-hoc (device-to-device network), or the like. Network interface 214 can be a modem connection, and/or any other mechanism that provides connectivity between the computing device 200 and one or more other devices. Note that one or more of the components of this system illustrated in FIG. 2 and associated hardware can be used in various embodiments as discussed herein.

Computing device 200 can optionally be coupled to display device 216, such as a light emitting diode (LED) display or a liquid crystal display (LCD) (e.g., coupled through bus 210 for displaying information to a user of computing device 200). Display device 216 can be integrated into computing device 200 (e.g., a touchscreen of a smartphone) or be external to computing device 200 (e.g., an external display coupled via a cable with device 200).

Computing device 200 can optionally include one or more user input device(s) 218, such as an alphanumeric input device (e.g., keyboard), a cursor control or other input signaling device (e.g., a touch-sensitive display (touchscreen), a touchpad, mouse, a trackball, stylus, or cursor direction keys) for controlling cursor movement and/or selection on a user interface displayed using display device 216.

In some embodiments, computing device 200 is a server or system of servers. For example, the server can be a collection of one or more computer hardware machines working together to perform processes and tasks described with respect to computing device 200. Thus, computing device 200 can be considered a logical construct, and references thereto can and should be interpreted as encompassing scope that includes computing device 200 being comprised of one or more computing devices (e.g., as device 200 is described) or several devices that together behave as computing device 200 has been described. As one of skill would appreciate, there is no requirement express or implied herein that the components of computing device 200 be dedicated or physical resources, or that the components must be located physically together. Rather, computing device 200 can be embodied in one or more virtual machines and/or certain functional components of computing device 200 can be remote from other functional components of device 200.

Figure 3:
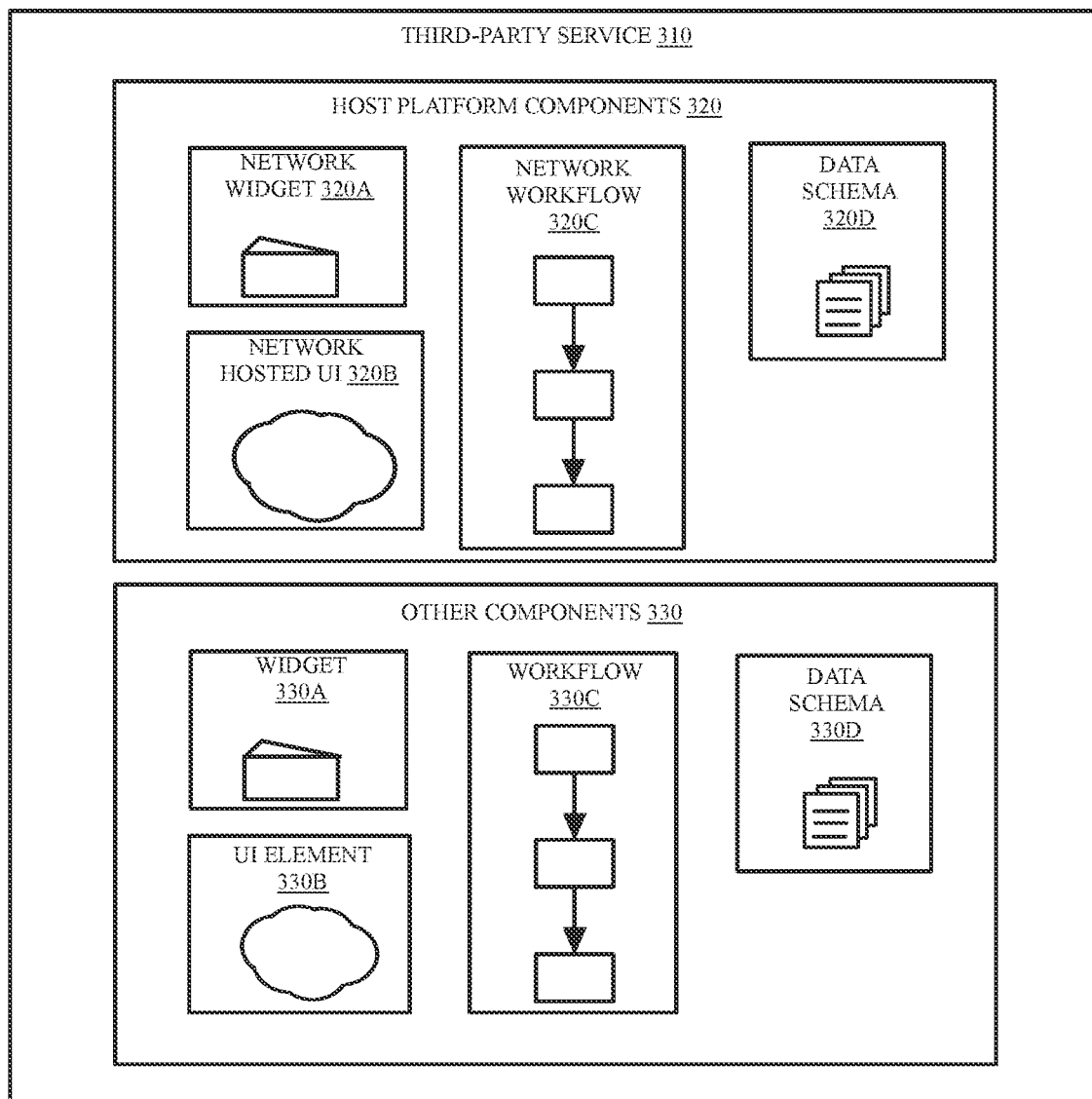
FIG. 3 is a block diagram showing an example service deployed using network components in accordance with one or more embodiments described herein.

FIG. 3 illustrates block diagram 300 illustrating the logical components of an example third-party service 310, in accordance with one or more embodiments. It should be recognized that more or fewer components and/or different components can be included in third-party service 310. A third-party service (e.g., 310) can be an application and/or a webpage. In this example, third-party service 310 is an application that includes both host platform components 320 and other components 330. For example, continuing with the example described with respect to FIG. 1, third-party service 310 is a business transaction tracking application. The business transaction tracking application includes host platform components 320 sourced from host platform sources (e.g., host platform network 110 or service provider networks 118) and integrated into the application and other components 330 sourced from the third-party separate from the host platform sources. In some embodiments, the integration of these components together is due to customization by an end-user. In other embodiments, the integration is performed by a third-party service provider (e.g., 150). Host platform components 320 include network widget 320A, network hosted UI 320B, network workflow 320C, and data schema 320D. For example, widget 320A can be an application component that arranges transaction data for presentation as a spreadsheet. Network hosted UI 320B can be a user interface element displayable by the application for receiving a user input command to refresh the transaction data from a server. Network workflow 320C can be a series of steps (e.g., functions and interfaces) that an end user of the application uses to select a transaction, choose to refund a transaction, receive a verification credential for authorizing the refund, and submit the refund for processing. Data schema 320D can be a data schema that describes how the business tracking application stores transaction data, so that such data can be read by other services.

As mentioned above, the example business transaction tracking application represented by third-party service 310 also includes other service platform components 330 not sourced from host platform sources (e.g., host platform network 110). For example, other service platform components 330 can include components not sourced from the host platform ecosystem, such as those that are developed by the third-party themself or sourced from another third party but not via a service provider network (e.g., 118A-118C).

Other service platform components 330 include widget 330A, UI element 330B, workflow 330C, and data schema 330D. For example, widget 330A can be an application component that adds support for foreign languages in interfaces of the application. UI element 330B can be a user interface element displayable by the application for providing an interface of a search feature. Workflow 330C can be a series of steps (e.g., functions and interfaces) sourced from an open-source repository that an end user of the application uses to select displayed data, take a screenshot by the application, activate an email client, and send the screenshot via the email client. Data schema 330D can be a data schema that describes how the business tracking application stores transaction data, so that such data can be read by other services.

In accordance with some embodiments, the architecture described above can allow developers to build and/or distribute modular applications that are built on a common ecosystem platform. This ecosystem stands in contrast to some legacy models of software tool development and distribution, such as (1) proprietary silos of vertically integrated components that lead to customers being "locked-in" to a set of software that may not meet all of their needs and/or (2) custom development of software solutions for integrating multiple software tools by different developers which requires development time, resources, and ongoing support.

With the above ecosystem framework in mind, attention is now directed towards techniques for reusing previously developed workflows.

Figure 4A:
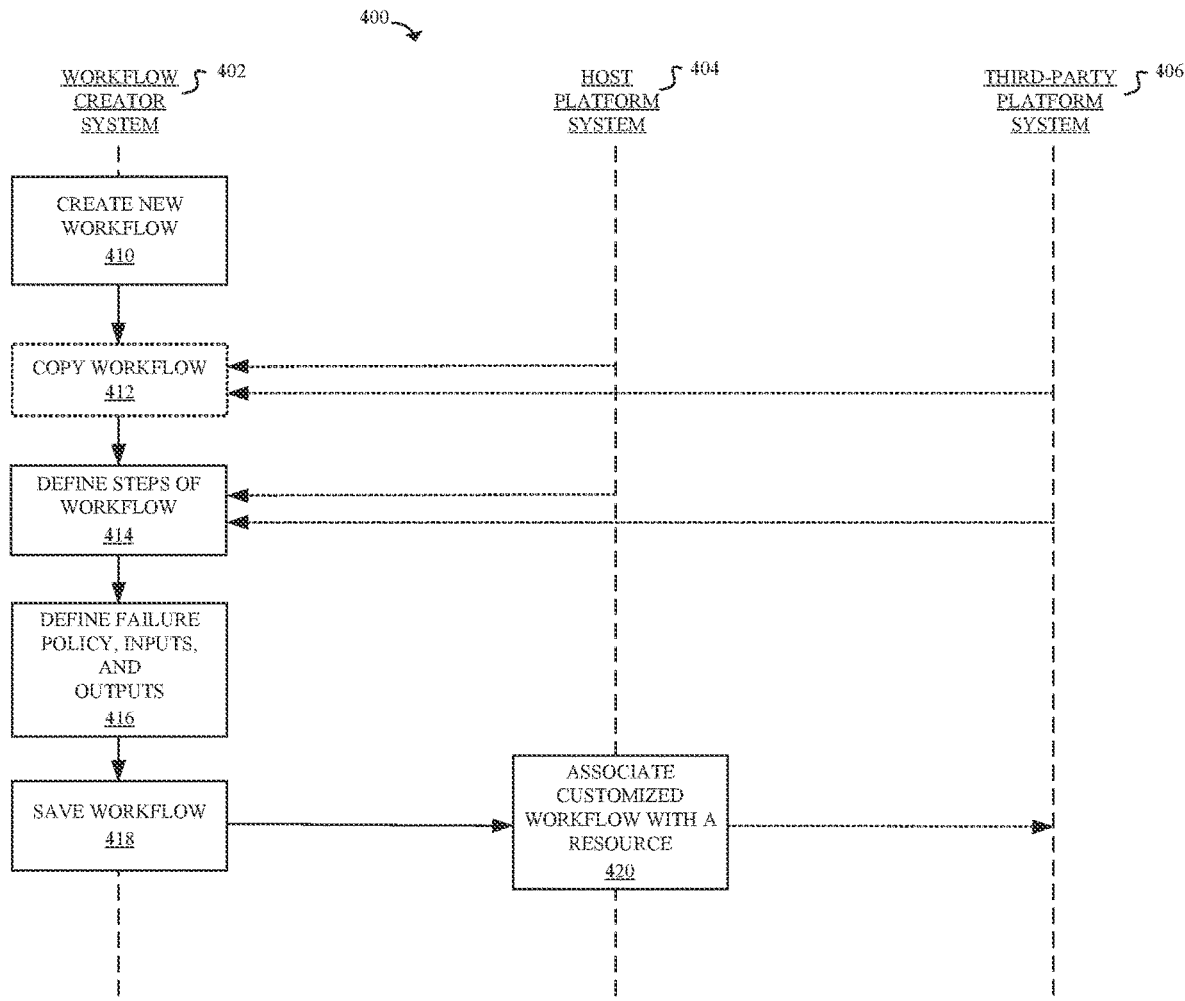
FIGS. 4A-4B are block diagrams illustrating various interactions of various components in accordance with one or more embodiments described herein.
Figure 4B:
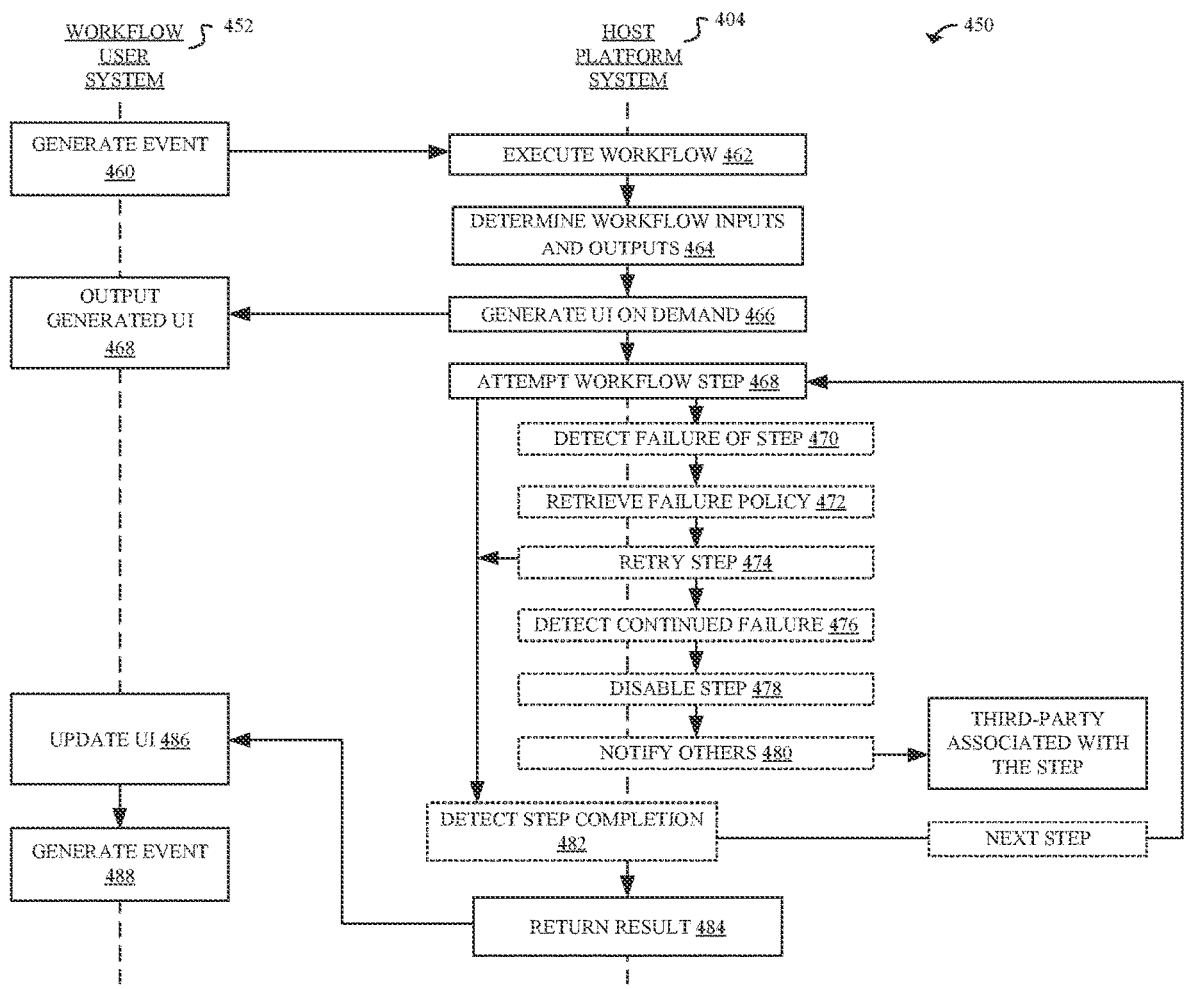

FIGS. 4A-4B are block diagrams illustrating various interactions of various components in accordance with one or more embodiments described herein. Moreover, FIGS. 4A-4B are provided as an example concerning the creation and deployment of a workflow. However, the example discussed below in relation to FIGS. 4A-4B is not limiting and is being used for exemplary purposes only. One or more other examples could have been used in lieu of or in addition to the example provided in relation to FIGS. 4A-4B to describe one or more aspects of this disclosure. Further, in the example and processes described with respect to FIGS. 4A-4B, certain blocks are described and illustrated as optional (having dotted line borders). Additionally, one or more other blocks of FIGS. 4A-4B that are not described and illustrated as optional can nonetheless be optional. Further, one or more blocks of FIGS. 4A-4B can be removed, and/or additional blocks can be added, and still be within the intended scope of this disclosure. Finally, the blocks depicted in FIGS. 4A-4B can be substituted, combined, and/or rearranged and still be within the intended scope of this disclosure.

As used herein, a workflow is a set of one or more steps for performing a task. The task performed by the workflow can be simple (e.g., retrieve data regarding business inventory and calculate an amount for a restocking order) or complex (e.g., providing a series of user interfaces to a customer enabling them to save items into a digital shopping cart and perform a checkout operation, including dynamically reacting to events due to user input by the customer). In some embodiments, a workflow includes one or more steps. In some embodiments, a step is a set of one or more operations that is performed (e.g., a process, one or more actions, or the like) as a result of detecting an event or condition. In some embodiments, a step (of the one or more steps) is a workflow. For example, a workflow that defines a series of steps for a shopping cart and checkout operation described above can include a workflow that performs the task of gathering information about an available product including price, a workflow that provides a user interface to a customer for building a pizza (with the available product (e.g., toppings)), a workflow that takes the price information and calculates a total amount due to be paid (e.g., taking into account appropriate taxes or other governmental fees, delivery or shipping fees based on customer location or items being purchased, tips, discounts, etc.), and a workflow that accepts payment from the customer for the total amount due to be paid for the selected product (pizza). This example is continued throughout the discussion of FIGS. 4A-4B below in order to illustrate various capabilities and operations associated with workflows, in accordance with some embodiments.

FIGS. 4A-4B describe a generic set of operations associated with creation and deployment of a workflow. For the benefit of the reader, these operations will be described with respect to the example of a merchant creating a workflow to help customers of a website (belonging to the merchant's business) complete a process for purchasing goods. In these examples the merchant is John's Pizza, a pizza company, which maintains an online storefront (e.g., website and/or web-connected application) that allows customers to select (e.g., add to a cart) and purchase goods (in this case, order a pizza). John's Pizza wants to create a workflow for checking out (e.g., completing) an online order that allows a customer to: customize and add a pizza to their cart (e.g., pizza builder step), determine a total payment due (e.g., checkout step to determine cost of pizza plus taxes, delivery, and tip), and make a payment to John's Pizza (e.g., payment step). After creation of the workflow, a customer can use this workflow (also referred to as a "pizza checkout workflow") deployed by John's Pizza to complete a checkout process.

As noted above, at least one step of the one or more steps of a workflow can also be a workflow. For example, a workflow can be a sub-part of another (e.g., main, top-level, parent) workflow. This other (e.g., parent) workflow can be configured to cause the one or more steps to operate together to achieve a task.

FIG. 4A includes block diagram 400, which illustrates interactions between workflow creator system 402 (e.g., a computing device of the merchant), host platform system 404 (e.g., a server of the host platform), and a third-party platform system 406 (e.g., a server of a third-party entity different from the host platform). Workflow creator system 402 is a device being used by a customer of John's Pizza (e.g., Jill). In this example, host platform system 404 is a server of the host platform (e.g., the same system that hosts host platform network 110) and third-party platform system 406 is a server that hosts John's Pizza application. In this example, workflow creator system 402 is a device of a user associated with John's Pizza (e.g., a developer associated with John's Pizza and/or an employee of John's pizza) (also referred to as John's Pizza hereafter). Workflow creator system 402, host platform system 404, and third-party platform system 406 can include one or more of the features described above with respect to computing device 200.

At block 410 of FIG. 4A, workflow creator system 402 receives user input that causes creation of a new workflow (e.g., the pizza checkout workflow). For example, the user can interact with a user interface (e.g., that includes user interface elements) of a software tool for composing a workflow (also referred to as a workflow composing tool, or other similar name). The user can select an option, in the workflow composing tool, to create a new workflow (e.g., start new blank workflow; create a new and/or modified instance of an existing workflow). The workflow composing tool can, for example, be developed and published by the host platform, and enable third-party developers (such as John's Pizza) to create and/or publish workflows, steps of workflows, or other components that can be used with the ecosystem. In response to the user input, at block 410, workflow creator system (e.g., 402) causes creation of a new workflow (e.g., the pizza checkout workflow) (e.g., a workflow having similar characteristics to workflows 120 of FIG. 1, network workflow 320C of FIG. 3, and/or workflow 330C of FIG. 3, described above). In some embodiments, the new workflow is created at the workflow creator system (e.g., 402). In some embodiments, the new workflow is created at the host platform system (e.g., 404). In some embodiments, the new workflow is created on another system (e.g., third-party platform system 406). For example, the new workflow can be created on (e.g., stored on) the workflow creator system 402, the host platform system 404, or some other third-party system (e.g., belonging to a third-party service provider).

Blocks 412 and 414 and the description below illustrate how John's Pizza can leverage the ecosystem maintained by the host platform in order to build a workflow that has been customized for their own business. Leveraging ecosystem components can allow John's Pizza to build a workflow (e.g., pizza checkout workflow) using some existing parts (e.g., steps, workflows) that are combined or otherwise modified.

At block 412 of FIG. 4A, an existing workflow is optionally copied. In this context, copy can include taking some or all the content from the existing workflow and using it to define at least a portion of the pizza builder workflow. In some examples, a workflow or steps may be downloaded from the network or ecosystem and integrated into the existing workflow that is created at block 410. In some embodiments, the workflows or steps downloaded from the network or ecosystem may be created by a third party or hosted by a third-party network. Block 412 is shown with a dotted border, to indicate it is optional (e.g., a user can create a workflow without copying an existing one). In this example, the existing workflow is a workflow that provides functionality that allows customers to build a pizza (e.g., select size, toppings, crust style) and add it to a digital shopping cart. The developer of the existing workflow has made it available to others in the ecosystem by publishing it to (or indicating its availability via) a host platform network (e.g., a server in host platform system 404). At block 412, dotted lines are shown leading from the host platform system 404 and third-party platform system 406 toward workflow creator system 402 to illustrate an optional flow of data representing the existing workflow. In this example, John's Pizza browses an index of existing workflows that are available for download and copying, selects an existing workflow, and optionally retrieves the existing workflow from host platform system 404 and/or third-party platform system 406. In some embodiments, to copy the workflow, the software developer sends a query to host platform system 404 that causes host platform system 404 to search for a workflow for building pizzas. In some embodiments, host platform system 404 returns a representation (e.g., an image, text, and/or the like) of the pizza checkout workflow in response to the query with an option for the software developer to copy the pizza checkout workflow. In some embodiments, in response to selecting the option to copy the pizza checkout workflow, a copy of at least a portion of the pizza checkout workflow is copied to host platform system 404.

As discussed above, the existing workflow (used as a basis for the pizza checkout workflow) is not associated with John's Pizza and/or John's Pizza did not generate (or develop) the existing workflow. In some embodiments, the pizza checkout workflow is generated by a developer that is associated with or that developed host platform system 404. For example, the host platform's developer can develop and publish the existing workflow to other entities via a host platform network (e.g., marketplace for browsing and accessing workflows). In some embodiments, the pizza checkout workflow is generated by a third-party developer (e.g., a third-party service provider) who did not develop host platform system 404. For example, the third-party developer can be a software vendor that sells software tools for businesses that sell food (e.g., restaurants). In some embodiments, to generate the pizza checkout workflow (or a step thereof), a developer uses and modifies an existing workflow that was stored at or by host platform system 404 and/or third-party platform system 406. In some embodiments, to generate the pizza checkout workflow, the software developer uses a user interface in a no-code and/or low-code environment, where the software developer can drag and drop user interface elements that represent one or more steps and/or logical components of the pizza checkout workflow (also referred to as a software tool for composing a workflow, workflow composing tool, or other similar name).

At block 414 of FIG. 4A, workflow creator system 402 defines one or more steps of the pizza checkout workflow. For example, defining one or more steps can include one or more of adding a step, modifying a step, and/or removing a step from the existing workflow that was copied. In some embodiments, defining steps can be done using the workflow composing tool, which can include user interface elements (e.g., visual elements displayed in a graphical user interface (GUI) that represent data and/or can be interacted with to cause user input). In some embodiments, in response to selecting the option to copy an existing workflow, workflow creator system displays a representation of the pizza checkout workflow that includes the steps from the existing workflow. In some embodiments, the representation of the pizza checkout workflow includes one or more representations of one or more steps of the pizza checkout workflow. For example, each step can be visually represented as being discrete form other steps (e.g., bounded by a border; shaded a different color; and/or the like). In some embodiments, in response to detecting user input directed to the representation of the pizza checkout workflow and/or the one or more representations of one or more steps of the pizza checkout workflow, workflow creator system 402 displays one or more indications of the pizza checkout workflow being modified and/or the one or more steps of the pizza checkout workflow being modified.

In some embodiments, when defining a step of the workflow, a user (e.g., John's Pizza) can designate whether a respective step of the pizza checkout workflow can be customized by another party. For example, as John' Pizza creates their pizza checkout workflow, they can designate whether a step can be modified by another developer who copies the pizza checkout workflow from John's Pizza (who makes it available via the host platform network when complete). Likewise, the existing workflow used by John's Pizza can include steps designated as not modifiable. In some of these embodiments, the user can define and/or limit how a particular step of the workflow can be modified.

In some embodiments, defining steps of a workflow includes defining one or more events (also referred to as triggers) that cause an action by the workflow (e.g., execution of the workflow, execution of the step (the whole step, or a portion of the step), ceasing execution, or the like). For example, within the pizza checkout workflow, the pizza builder step can be triggered by an event corresponding to user input selection of an option to build a pizza on John's Pizza's webpage. Likewise, a payment step can be triggered by an event corresponding to user input selection of an option to "pay now" presented at the checkout step (e.g., where a total, taxes, delivery fees, and tip are determined and/or specified). In some embodiments, an event is external to a workflow (e.g., comes from a process, step, or device that is not the same as the workflow).

One or more existing workflows, steps, and/or components, can come from a network (e.g., host platform network, and/or a third-party service provider network) for accessing workflows (e.g., a marketplace). In some embodiments, a user (e.g., John's Pizza) can query a host platform system (e.g., 404) for one or more existing workflows, steps, and/or components, and after querying the host platform system, the user can incorporate (and/or reuse) one or more of the workflows, steps, and/or other components found by host platform system into a workflow (e.g., the pizza checkout workflow). For example, John's Pizza can navigate (e.g., using a web browser, the workflow composing tool, or the like) to the host platform network where it copied the existing workflow (e.g., that provides functionality that allows customers to build a pizza) and retrieve an additional step for performing the task of accepting customer payment (hereinafter referred to also as the "payment step") for a pizza that was built using the pizza builder step. In this example, the payment step is developed by the developer of the host platform network. In some embodiments, a step or workflow is defined as being required to be performed by a certain system and/or entity. For example, a step can be defined as required to be performed by the host platform system. A reason for this can include a need for increased safeguards of the privacy and/or security of the data being received, handled, and/or output by the step. In this case, the payment step requires input of the customer's personal data and payment information (e.g., a credit card number). Rather than allowing John's Pizza to execute this step on their system, host platform system 404 handles this step (e.g., retrieves needed information from the prior step, provides output to the next step) so that the customer's sensitive data does not need to be revealed to a system associated with the merchant.

In some embodiments, in conjunction with (e.g., after and/or while) the modifications occurring, the pizza checkout workflow is a new workflow created that includes the modifications to the existing workflow. For example, while FIG. 4A illustrates block 410 (create new workflow) occurring before blocks 412 and 414, these steps can happen in any order and/or correspond to the same action (e.g., selecting an option to copy an existing workflow can result in copying and creation occurring in conjunction with one another (e.g., at the same time)).

At block 416 of FIG. 4A, the workflow creator system 602 defines, for a step and/or the workflow: one or more failure policies, one or more inputs, and one or more outputs. In some embodiments, failure policies, inputs, and outputs are defined in one or more data schema associated with (e.g., included in and/or stored with) the workflow. In some embodiments, a failure policy is a set of one or more actions to take in response to a failure of the workflow during execution. A failure policy can be set for one or more specific steps of a workflow and/or for the complete workflow. The one or more inputs expected by a step and/or the workflow are defined such that a system executing the workflow can provide information that will allow the workflow to function correctly. The one or more outputs expected from a step and/or the workflow are defined such that a system executing the workflow knows what information the workflow will output (e.g., which can be used as input into another process or workflow). Defined failure policies, inputs, and/or outputs can be specified in data associated with (e.g., included in) the workflow. For example, at block 416, a failure policy can be set for the following steps of the pizza checkout workflow: the pizza builder step and the checkout step. With respect to the pizza builder step building a pizza, the failure policy can define what to do if a malformed or missing input is received from a customer (e.g., cause a prompt and user interface for correcting the error, and if further user input is still malformed or missing, then remove pizza from order). With respect to the checkout step (e.g., that accepts delivery details), the failure policy can define what to do if an invalid address is received from a customer (e.g., suggest of a proper address that is similar (if one can be found) or prompt the customer to re-enter a valid address (if no similar address can be found)).

In some embodiments, the failure policy can define one or more of: remedial actions to be taken (e.g., to overcome or correct the error) and/or how many times the workflow can perform remedial actions (e.g., retry, or try something else). For example, a limit on the number of remedial actions can prevent the workflow from infinitely retrying a step that fails. In some embodiments, the software developer can modify one or more failure policies (e.g., execution criteria and/or retry criteria) for each step of the pizza checkout workflow, for a group of steps for the pizza checkout workflow, and/or for the entire pizza checkout workflow. In some embodiments, a failure policy that is associated with (e.g., directed to and/or corresponds to) a particular step of the pizza checkout workflow takes precedence over a failure policy that is associated with the pizza checkout workflow (e.g., the pizza checkout workflow as a whole). In some embodiments, a failure policy that is associated with a particular step of the pizza checkout workflow takes precedence over a failure policy that is associated with a group of steps that includes the particular step. In some embodiments, when defining (e.g., editing or adding) a failure policy, the software developer can define whether the failure policy is customizable or not by other third-party software developers. In some embodiments, once a failure policy is modified, added, or deleted for a particular step, for a group of steps, and/or for the pizza checkout workflow, a system (e.g., 402, 404, 406) stores, deletes, and/or updates the failure policy.

At block 418 of FIG. 4A, the workflow creator system 402 causes the pizza checkout workflow to be saved (e.g., stored). In this example, the pizza checkout workflow is sent to host platform system 404 for storage. At block 420, host platform system 404 associates the customized workflow (e.g., pizza checkout workflow) with a resource (e.g., copied to a server and/or associated with an identifier that corresponds to John's Pizza and/or assigned to an account (e.g., an account on host platform system 404) that belongs to John's Pizza). In some embodiments, the resource is a resource associated with the workflow creator (e.g., John's Pizza). For example, host platform system 404 hosts John's Pizza's pizza checkout workflow such that each step in the workflow is executed by the host platform system 404 (in communication with a customer system and/or John's Pizza's system). In some embodiments, third-party platform system 406 (e.g., a server belonging to John's Pizza) stores and executes at least one step of the pizza checkout workflow. For example, only the payment step can be performed at the host platform system 404, while the pizza builder step is stored and executed at the third-party platform system 406. In some embodiments, the pizza checkout workflow is sent to third-party platform system 406 as the pizza checkout workflow is being updated. In some embodiments, the updated pizza checkout workflow is sent to third-party platform system 406 after the pizza checkout workflow has been fully updated and/or upon receiving confirmation (e.g., approval) from the software developer of the updated pizza checkout workflow. In some embodiments, the third-party is associated with the workflow creator (e.g., is John's Pizza, or manages a system for John's Pizza). In some embodiments, the third-party is not associated with the workflow creator (e.g., is an entity other than John's Pizza or the host platform). In some embodiments, confirmation is instant (e.g., automatically granted) where an existing workflow (that is confirmed) is modified with one or more existing steps or workflows (that are also confirmed). For example, combining two steps that have already been approved can result in automatic approval (e.g., depending on host platform policies) of the new workflow that is created by simply combining the two steps. Modifications of confirmed steps or workflows can, however, result in confirmation not being automatic (e.g., such as if operations are changed within the step, and/or if inputs and outputs change, etc.).

In some embodiments, a workflow and/or step includes an indication of the developer and/or entity that created it. For example, John's Pizza can see that the payment step is a step developed and published by the entity associated with the host platform. This can serve as an indication of origin and/or reputation. In some embodiments, certain developers and/or entities can result in automatic confirmation. For example, combination of only steps made by the entity associated with the host platform can result in automatic approval (e.g., because they will have been confirmed already).

In some embodiments, in conjunction with saving the pizza checkout workflow, a system (e.g., host platform system 404 and/or third-party platform system 406) notifies other entities (e.g., parties) that were using a previous version of the pizza checkout workflow that the pizza checkout workflow has been updated. For example, if the pizza checkout workflow is intended to replace the previous version of the existing workflow, other entities that use the existing workflow can be notified that the workflow has been updated (e.g., to give the other entities the option of whether to use the new version and/or to notify the entity to ensure the new version does not cause failures for the other entities). In some embodiments, third-party platform system 406 only notifies the other entities if the software developer that updated the pizza checkout workflow was the original developer of the pizza checkout workflow (e.g., the version of the pizza checkout workflow generated at block 410) (e.g., irrespective of whether the pizza checkout workflow was modified at any point in time since creation of the respective work).

FIG. 4B includes block diagram 450, which illustrates interactions between workflow user system 452 (e.g., a computing device of a customer of the merchant) and host platform system 404 (e.g., a server of the host platform). Workflow user system 452 is a device being used by a customer of John's Pizza (e.g., Jill). Workflow user system 452 can include one or more of the features described above with respect to computing device 200.

At block 460 of FIG. 4B, workflow user system 452 generates an event (e.g., due to user input). In some embodiments, a workflow and/or step is configured to trigger a response (e.g., begin executing, perform an action, etc.) in response to an event. The event in this example is a workflow user (Jill, the customer of John's Pizza) selecting an option to begin building their own pizza on a webpage associated with John's Pizza. In response to the selection, an event is generated which triggers execution of the pizza checkout workflow.

At block 462 of FIG. 4B, host platform system 404 begins executing the pizza checkout workflow (or each step of the workflow) (e.g., the workflow stored at third-party platform system 406 and/or at host platform system 404).

At block 464 of FIG. 4B, host platform system 404 determines inputs and outputs of the pizza checkout workflow. One of the characteristics of workflows can be the ability to be correctly displayed by many surfaces (e.g., devices, applications) and/or contexts (e.g., deployments that can differ based on one or more variables (e.g., customer's current country)). Determining what inputs are needed and what outputs will be displayed can allow host platform system 404 to determine one or more user interface elements of a user interface to display. For example, if a customer has selected to apply a coupon for a one-topping large-sized pizza, the pizza builder step can cause a user interface to be displayed at workflow user system 452 that depicts a large-sized pizza for customization, where a maximum of one topping can be selected at a time.

At block 466 of FIG. 4B, host platform system 404 generates one or more user interfaces (e.g., including one or more user interface elements) on demand. As noted above, a workflow (and steps thereof) can operate differently (and have different user interfaces) dependent on an operating context (e.g., user specified settings, user device characteristics, country, time of day, selected product characteristics, etc.).

In some embodiments, a workflow is configured to be deployed in many different contexts, including by one or more different types of systems (e.g., 200, 402, 452) and/or user interfaces (e.g., on a webpage via a browser client, in an application client). For example, the software developer does not have to specifically design particular steps of the pizza checkout workflow that enable the pizza checkout workflow to be configured to be executed on different types of workflow user systems.

In some embodiments, user interfaces (e.g., one or more user interface elements) are generated on demand (e.g., dynamically) (e.g., when the workflow is executed). This on-demand generation can account for things such as what particular input is required by the workflow (or step), what particular output needs to be displayed, and the characteristics of the device that is displaying the user interface. For example, if a workflow requires certain data for input that the system does not have, the workflow can recognize additional user input of data is needed and dynamically generate a user interface element that is displayed at a system of a workflow user (e.g., here, a customer) that prompts for the additional data. This stands in contrast to having the workflow simply fail because required data is missing and there is no pre-programmed user interface for the current user system and/or step that would allow input of the needed data. In some embodiments, one or more data schemas are used to define one or more inputs needed by a step or workflow. In some embodiments, one or more data schemas are used to define one or more outputs of a step or workflow. Defining a data schema that includes what inputs will be needed by steps of the workflow can also allow for compact and efficient user interfaces. For example, a user interface can be optimized to include user interface elements corresponding to input that is needed, outputs that will be generated, and omit (e.g., forgo) displaying user interface elements that are not relevant to the workflow. In some embodiments, the host platform provides the software tools (e.g., primitives) to enable the pizza checkout workflow to be configured to be executed on different types of workflow user systems.

At block 468 of FIG. 4B, host platform system 404 attempts a workflow step. For example, the first step of the pizza checkout workflow is the pizza builder step, which allows the customer to create a customized pizza that will ultimately be purchased using the workflow. In some embodiments, attempting a workflow step includes one or more of: retrieving required inputs from a resource (e.g., another process, step, workflow, or system) and/or a user (e.g., workflow user (the customer) via prompting), validating the inputs to ensure correct syntax, performing operations using the inputs in order to generate one or more outputs, and/or validating the one or more outputs. This list of actions is not intended to be exhaustive. In some embodiments, an attempt to complete a workflow step results in a failure. In some embodiments, an attempt to complete a workflow step results in success (e.g., completion of the step).

At block 470 of FIG. 4B, host platform system 404 detects failure of the attempted step (the pizza builder step). Failure of the pizza builder step can be caused by several reasons, including one or more of missing input being detected, malformed input being detected, one or more permissions not being received (e.g., permission to access a database and/or data belong to other users), and/or one or more conditions not being satisfied (e.g., such as a user not being authorized to perform the pizza builder step and/or communication between the workflow user system 452 and host platform system 404 failed while the pizza builder step was being executed).

At block 472 of FIG. 4B, host platform system 404 retrieves a failure policy corresponding to the pizza builder step (e.g., because failure of the pizza checkout workflow step was detected). In some embodiments, the failure policy corresponding to the pizza builder step is retrieved by host platform system 404 (e.g., from a remote resource). In other embodiments, the failure policy corresponding to the pizza builder step is retrieved locally on host platform system 404.

A failure policy can lead to resolution of the failed step during workflow execution and can be defined in many ways. In some embodiments, the failure policy includes a policy that causes the pizza builder step to be retried no more than a threshold number of times (e.g., 1-10 times), where the threshold number of times is set by the software developer (e.g., John's Pizza). In some embodiments, a software developer has an upper limit for which to set the threshold (e.g., 7-10) for retrying the pizza builder step. In some embodiments, the failure policy includes a policy that causes the pizza builder step to be disabled and/or skipped (e.g., where the next step to the respective step (e.g., checkout step for calculating a total) is executed before the pizza builder step is deemed to be successful) when the pizza builder step fails. In some embodiments, the failure policy includes a policy that causes the updated pizza checkout workflow to cease execution after the pizza builder step. In some embodiments, the failure policy includes a policy that requires the workflow user system to be reverified after the pizza builder step fails (e.g., before the pizza checkout workflow can continue execution and/or before the pizza builder step can be retried). It is understood that one or more other policies directed towards the resolution of a failed step could be envisioned, and the examples provided above are for illustrative purposes only. As discussed above, a failure policy for a respective step can be defined at the step level, at a group of steps level, or at the workflow level. It is anticipated that in this example the failure of a respective step is resolved in a similar manner as described below, irrespective of where (e.g., at what level) the failure policy for the respective step is defined. In some embodiments, the failure of a respective step can be resolved in different manners dependent on where the respective step is defined.

At block 474 of FIG. 4B, host platform system 404 retries execution of the pizza builder step according to (e.g., if allowed by) the retrieved failure policy. In some embodiments, the pizza builder step is retried in a certain manner (e.g., at certain intervals of time and/or with additional information from the workflow user system) according to the retrieved failure policy. In some embodiments, the pizza builder step is retried a number of times according to the retrieved failure policy. In some embodiments, the pizza builder step is not retried and is immediately disabled instead. In conjunction with block 474 of FIG. 4B, a determination is made concerning whether the retry of the pizza builder step (e.g., re-execution according to the retrieved failure policy) was successful or not. If the retry of the pizza builder step was successful, the operation moves to block 482 as described below. If the re-execution of the pizza builder step was not successful, the operation moves to block 476 as described below.

At block 476 of FIG. 4B, host platform system 404 detects at least one subsequent failure of the pizza builder step. It should be understood that block 476 of FIG. 4B is reached once one or more subsequent failures of the pizza builder step are identified and the pizza builder step does not successfully execute (e.g., after a number of retries defined in the failure policy) (e.g., and/or for another reason according to the failure policy of the pizza builder step and/or a failure policy of the pizza checkout workflow).

At block 478 of FIG. 4B, host platform system 404 disables the failed step. For example, because at least one subsequent failure of the pizza builder step is detected at host platform system 404, the pizza builder step is optionally disabled by host platform system 404. For example, host platform system 404 can cause pizza builder step to be disabled on other workflows that incorporate that step. Thus, if other pizza businesses use the same pizza builder workflow that failed, and the failure is not due to an isolated incident only relevant to a particular customer or context, then that step is disabled. Such a failure can occur at a global level if, for example, a resource relied upon by the step (e.g., a third-party platform server) is offline.

At block 480 of FIG. 4B, host platform system 404 notifies one or more third party associated with the failed step (e.g., other users and/or creators of the step and/or workflow that failed). Moreover, because at least one subsequent failure of the pizza builder step is detected at host platform system 404, host platform system 404 causes notification(s) to be sent to one or more third-party workflow users (e.g., other third-party developers) via host platform system 404. In some embodiments, host platform system 404 disables instances of the pizza builder step and/or the updated pizza checkout workflow from being executed by the other developers and/or users of the updated pizza checkout workflow (e.g., if the one or more developers and/or users have copied the updated workflow). In some embodiments, host platform system 404 removes the updated pizza checkout workflow and/or the pizza builder step from being displayed in an application marketplace or network, where one or more workflows and/or other components of workflows are shared between one or more merchants, businesses, and/or software developers.

At block 482 of FIG. 4B (from block 468), host platform system 404 determines that the pizza builder step was successfully completed. In response to detecting that the step is successfully completed, the host platform system 404 can proceed to attempt a next step (if there is one) (and return to block 468) or proceed to return a result. In this example, the pizza builder workflow proceeds on to the checkout step for determining a total amount due for the selected pizza. To continue the example, in response to the workflow user entering their address (e.g., to determine delivery fee and taxes) and confirming the total amount, the checkout step can be completed and cause the payment step to be attempted.

At block 484 of FIG. 4B, host platform system 404 returns one or more results to workflow user system 452. For example, the results can be an updated user interface (e.g., to display a built pizza at a user interface of the pizza builder step).

At block 486 of FIG. 4B, workflow user system 452 updates the user interface in response to receiving the returned result.

At block 488 of FIG. 4B, host platform system 404 generates another event. For example, generation of this event can cause in response, execution of a different step (e.g., checkout step, payment step) is caused at workflow user system 452. In some embodiments, one or more of blocks 422-436 are repeated until all steps of the pizza checkout workflow are executed and/or until the pizza checkout workflow and/or one or more respective steps of the workflow are disabled.

Figure 5:
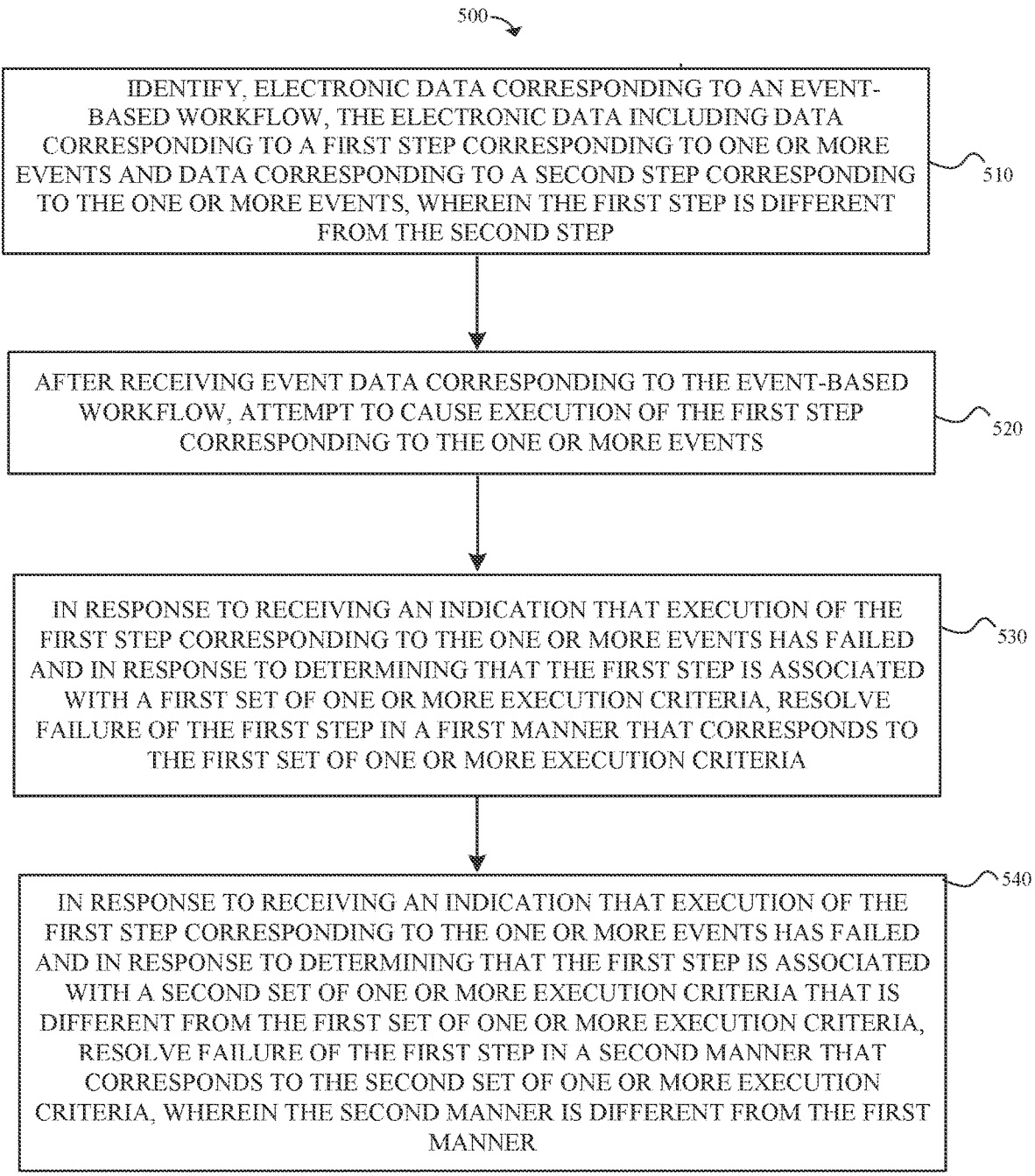
FIG. 5 is a flow diagram illustrating a method for managing one or more workflows in accordance with one or more embodiments described herein.

FIG. 5 is a flow diagram illustrating a method for managing one or more workflows in accordance with one or more embodiments described herein. In some embodiments, the method is performed by one or more computer systems (e.g., one or more of 200, 402, 404, 406, 452) (e.g., a server, a personal computing device, and/or a mobile device).

At block 510, the computer system identifies electronic data corresponding to an event-based workflow (e.g., a workflow, such as pizza checkout workflow), the electronic data including data corresponding to a first step (e.g., pizza builder step) corresponding to one or more events (e.g., user input) and data corresponding to a second step (e.g., payment step) corresponding to the one or more events, where the first step is different from the second step. In some embodiments, one or more of the first step and the second step are customizable based on a preference of a publisher (e.g., a developer and/or a creator) of the first step. In some embodiments, the first step is a third-party step that is associated with an application marketplace and/or network. In some embodiments, the steps of a workflow are stored on different servers. In some embodiments, data corresponding to the first step is stored on a first server and not a second server that is different from the first server. In some embodiments, data corresponding to the second step is stored on the second server.

At block 520, after receiving event data (e.g., user input that triggers an event) corresponding to the event-based workflow, the computer system attempts to cause execution of the first step corresponding to the one or more events.

At block 530, in response to receiving an indication that execution of the first step corresponding to the one or more events has failed (e.g., block 470) and in response to determining that the first step is associated with a first set of one or more execution criteria (e.g., failure policy), the computer system resolves failure of the first step in a first manner that corresponds to the first set of one or more execution criteria (e.g., after attempting to cause execution of the first step corresponding to the one or more events).

At block 540, in response to receiving an indication that execution of the first step corresponding to the one or more events has failed and in response to determining that the first step is associated with a second set of one or more execution criteria that is different from the first set of one or more execution (and/or retry) criteria, the computer system resolves failure of the first step in a second manner that corresponds to the second set of one or more execution criteria (e.g., after attempting to cause execution of the first step corresponding to the one or more events), where the second manner is different from the first manner. For example, a first failure policy can specify that the step/workflow fails immediate, and a second failure policy can specify that the step/workflow should be retried once.

In some embodiments, steps that fail (e.g., fail more than a threshold number of times) get disabled for future execution for the workflow at other devices, and the computer system notifies users with other instances of step that the step has failed (e.g., and/or should be disabled). In some embodiments, resolving failure of the first step in the first manner includes disabling the first step (e.g., block 478). In some embodiments, in conjunction with disabling the first step, the computer system sends one or more notifications (e.g., messages) (e.g., block 480) to one or more users, who have indicated that the first step should be performed (e.g., are using the first step in a workflow associated with the one or more users), that the first step has been disabled.

In some embodiments, the event-based workflow is a modified version of (e.g., a version that includes one or more changes to) a preexisting event-based workflow (e.g., pizza builder step) (e.g., pizza checkout workflow). In some embodiments, the first step is an addition, to the preexisting event-based workflow, made by a third-party that is not the creator of the preexisting event-based workflow. In some embodiments, the second step is present in the preexisting event-based workflow and is created by the creator of the preexisting workflow. For example, a user (e.g., associated with John's Pizza) took a preexisting workflow that included the second step (e.g., a pizza builder step) and added the first step (e.g., a payment step), which resulted in creation of the event-based workflow.

In some embodiments, different execution policies are defined to include a different number of retries and/or define different events (e.g., skipping of step, executing and/or entering into another workflow, and/or disabling the workflow) to be performed after failure occurs. In some embodiments, resolving failure of the first step in the first manner includes re-attempting to cause execution of the first step corresponding to the one or more events a first number of times, and resolving failure of the second step in the second manner includes re-attempting to cause execution of the second step corresponding to the one or more events a second number of times that is different from the first number of times.

In some embodiments, the one or more execution criteria are defined at the step level and not at the workflow level. In some embodiments, the first set of one or more execution criteria or the second set of one or more execution criteria is defined as being related to the first step. In some embodiments, after resolving failure of the first step, the computer system attempts to cause execution of the second step corresponding to the one or more events. In some embodiments, in response to receiving an indication that execution of the second step corresponding to the one or more events has failed, the computer system resolves failure of the second step in a third manner that corresponds to a third set of one or more execution criteria, wherein the third set of one or more execution criteria is not defined as being related to the first step.

In some embodiments, one or more execution criteria is defined at the workflow level. In some embodiments, the first set of one or more execution criteria or the second set of one or more execution criteria is defined as being related to an event-based workflow that corresponds to the one or more events. In some embodiments, after resolving failure of the first step, attempting to cause execution of a third step corresponding to the one or more events. In some embodiments, the third step is different from the first step. In some embodiments, in response to receiving an indication that execution of the third step corresponding to the one or more events has failed, the computer system resolves failure of the third step in a fourth manner that corresponds to a fourth set of one or more execution criteria, wherein the fourth set of one or more execution criteria is defined as being related to the event-based workflow that corresponds to the one or more events.

In some embodiments, some types of steps of workflows are required to be handled at certain devices (e.g., payment information and/or other sensitive information) while other steps of workflows can be performed on other device, which is determined based on data related to the step. In some embodiments, in accordance with a determination that data corresponding to the first step corresponding to the one or more events is a first type of data and data corresponding to the second step corresponding to the one or more events is a second type of data that is different from the first type of data, the first step is required to be performed by a first server (e.g., 404) and the second step is required to be performed by a third-party server (e.g., 406). In some embodiments, the first type of data includes data (e.g., confidential information such as financial data, personal data, and/or the like) that is accessible by the first server but not the third-party server.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described to best explain the principles and practical applications of the various embodiments, to thereby enable others skilled in the art to best utilize the various embodiments with various modifications as may be suited to the particular use contemplated.

What is claimed is:

1. A computer system, comprising:
one or more processors; and
memory storing one or more programs configured to be executed by the one or more processors, the one or more programs including instructions for:
identifying electronic data corresponding to an event-based workflow, the electronic data including data corresponding to a first step corresponding to one or more events and data corresponding to a second step corresponding to the one or more events, wherein the first step is different from the second step;
after receiving event data corresponding to the event-based workflow, attempting to cause execution of the first step corresponding to the one or more events; and
in response to receiving an indication that execution of the first step corresponding to the one or more events has failed:
in response to determining that the first step is associated with a first set of one or more execution criteria, resolving failure of the first step in a first manner that corresponds to the first set of one or more execution criteria; and
in response to determining that the first step is associated with a second set of one or more execution criteria that is different from the first set of one or more execution criteria, resolving failure of the first step in a second manner that corresponds to the second set of one or more execution criteria, wherein the second manner is different from the first manner.

2. The computer system of claim 1, wherein the first set of one or more execution criteria or the second set of one or more execution criteria is defined as being related to the first step, and wherein the one or more programs include instructions for:
after resolving failure of the first step, attempting to cause execution of the second step corresponding to the one or more events; and
in response to receiving an indication that execution of the second step corresponding to the one or more events has failed, resolving failure of the second step in a third manner that corresponds to a third set of one or more execution criteria, wherein the third set of one or more execution criteria is not defined as being related to the first step.

3. The computer system of claim 1, wherein the event-based workflow is a modified version of a preexisting event-based workflow,
wherein the first step is an addition, to the preexisting event-based workflow, made by a third-party that is not the creator of the preexisting event-based workflow, and
wherein the second step is present in the preexisting event-based workflow and is created by the creator of the preexisting event-based workflow.

4. The computer system of claim 1, wherein resolving failure of the first step in the first manner includes disabling the first step, and wherein the one or more programs include instructions for:
in conjunction with disabling the first step, sending one or more notifications to one or more users, who have indicated that the first step should be performed, that the first step has been disabled.

5. The computer system of claim 1, wherein:
in accordance with a determination that data corresponding to the first step is a first type of data and data corresponding to the second step is a second type of data that is different from the first type of data, the first step is required to be performed by a first server and the second step is required to be performed by a third-party server.

6. The computer system of claim 5, wherein the first type of data includes data that is accessible by the first server but not the third-party server.

7. The computer system of claim 1, wherein one or more of the first step and the second step are customizable based on a preference of a publisher of the first step.

8. A non-transitory computer-readable storage medium storing one or more programs configured to be executed by one or more processors of a computer system, the one or more programs including instructions for:
identifying electronic data corresponding to an event-based workflow, the electronic data including data corresponding to a first step corresponding to the one or more events and data corresponding to a second step corresponding to one or more events, wherein the first step is different from the second step;
after identifying data corresponding to the event-based workflow, attempting to cause execution of the first step corresponding to the one or more events; and in response to receiving an indication that execution of the first step corresponding to the one or more events has failed:
    in response to determining that the first step is associated with a first set of one or more execution criteria, resolving failure of the first step in a first manner that corresponds to the first set of one or more execution criteria; and
    in response to determining that the first step is associated with a second set of one or more execution criteria that is different from the first set of one or more execution criteria, resolving failure of the first step in a second manner that corresponds to the second set of one or more execution criteria, wherein the second manner is different from the first manner.

9. The non-transitory computer-readable storage medium of claim 8, wherein the first set of one or more execution criteria or the second set of one or more execution criteria is defined as being related to the first step, and wherein the one or more programs include instructions for:
    after resolving failure of the first step, attempting to cause execution of the second step corresponding to the one or more events; and
    in response to receiving an indication that execution of the second step corresponding to the one or more events has failed, resolving failure of the second step in a third manner that corresponds a third set of one or more execution criteria, wherein the third set of one or more execution criteria is not defined as being related to the first step.

10. The non-transitory computer-readable storage medium of claim 8, wherein the event-based workflow is a modified version of a preexisting event-based workflow,
    wherein the first step is an addition, to the preexisting event-based workflow, made by a third-party that is not the creator of the preexisting event-based workflow, and
    wherein the second step is present in the preexisting event-based workflow and is created by the creator of the preexisting event-based workflow.

11. The non-transitory computer-readable storage medium of claim 8, wherein:
    in accordance with a determination that data corresponding to the first step is a first type of data and data corresponding to the second step is a second type of data that is different from the first type of data, the first step is required to be performed by a first server and the second step is required to be performed by a third-party server.

12. The non-transitory computer-readable storage medium of claim 11, wherein the first type of data includes data that is accessible by the first server but not the third-party server.

13. The non-transitory computer-readable storage medium of claim 8, wherein resolving failure of the first step in the first manner includes disabling the first step, and wherein the one or more programs include instructions for:
    in conjunction with disabling the first step, sending one or more notifications to one or more users, who have indicated that the first step should be performed, that the first step has been disabled.

14. The non-transitory computer-readable storage medium of claim 8, wherein one or more of the first step and the second step are customizable based on a preference of a publisher of the first step.

15. A method, comprising:
    by a computer system:
        identifying electronic data corresponding to an event-based workflow, the electronic data including data corresponding to a first step corresponding to one or more events and data corresponding to a second step corresponding to the one or more events, wherein the first step is different from the second step;
        after identifying data corresponding to the event-based workflow, attempting to cause execution of the first step corresponding to the one or more events; and
        in response to receiving an indication that execution of the first step corresponding to the one or more events has failed:
            in response to determining that the first step is associated with a first set of one or more execution criteria, resolving failure of the first step in a first manner that corresponds to the first set of one or more execution criteria; and
            in response to determining that the first step is associated with a second set of one or more execution criteria that is different from the first set of one or more execution criteria, resolving failure of the first step in a second manner that corresponds to the second set of one or more execution criteria, wherein the second manner is different from the first manner.

16. The method of claim 15, wherein the first set of one or more execution criteria or the second set of one or more execution criteria is defined as being related to the first step, and wherein the method further comprises:
    after resolving failure of the first step, attempting to cause execution of the second step corresponding to the one or more events; and
    in response to receiving an indication that execution of the second step corresponding to the one or more events has failed, resolving failure of the second step in a third manner that corresponds a third set of one or more execution criteria, wherein the third set of one or more execution criteria is not defined as being related to the first step.

17. The method of claim 15, wherein the event-based workflow is a modified version of a preexisting event-based workflow,
    wherein the first step is an addition, to the preexisting event-based workflow, made by a third-party that is not the creator of the preexisting event-based workflow, and
    wherein the second step is present in the preexisting event-based workflow and is created by the creator of the preexisting event-based workflow.

18. The method of claim 15, wherein:
    in accordance with a determination that data corresponding to the first step is a first type of data and data corresponding to the second step is a second type of data that is different from the first type of data, the first step is required to be performed by a first server and the second step is required to be performed by a third-party server.

19. The method of claim 18, wherein the first type of data includes data that is accessible by the first server but not the third-party server.

20. The method of claim 15, wherein resolving failure of the first step in the first manner includes disabling the first step, and wherein the one or more programs include instructions for:

in conjunction with disabling the first step, sending one or more notifications to one or more users, who have indicated that the first step should be performed, that the first step has been disabled.

* * * * *